Nov. 22, 1960     J. T. FISHER     2,961,064
LIQUID SEPARATOR
Filed Nov. 14, 1958
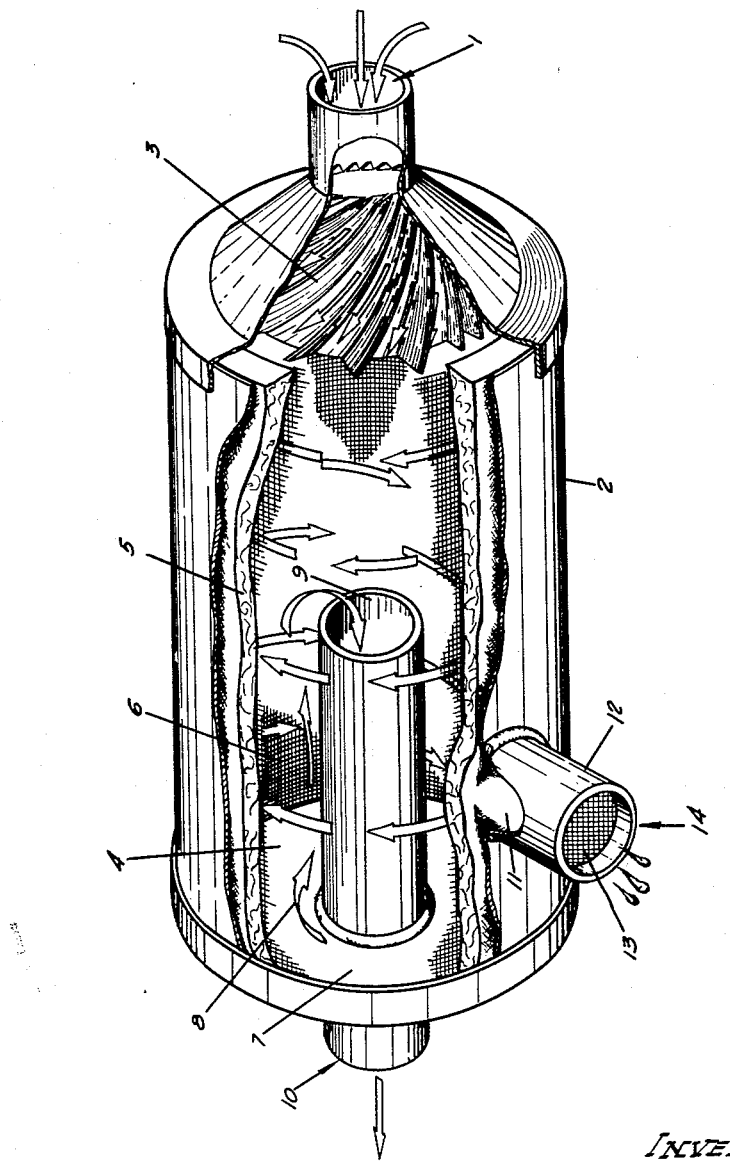
INVENTOR
JOHN T. FISHER
BY     ATTORNEY

United States Patent Office 2,961,064
Patented Nov. 22, 1960

2,961,064

LIQUID SEPARATOR

John T. Fisher, Indianapolis, Ind., assignor to Stewart-Warner Corporation, Chicago, Ill., a corporation of Virginia Filed Nov. 14, 1958, Ser. No. 773,878

6 Claims. (Cl. 183—80)

This invention relates to apparatus for separating liquids from gaseous mediums, and in particular to apparatus especially adapted for separating moisture from air.

A principal object of the invention is to provide a self-emptying separator which removes under minimal pressure drop levels from 97 to 100% of free moisture from any gas stream regardless of attitude, altitude or environment and which employs no relatively movable components.

The subject separator is specifically adapted to meet the stringent requirements of air conditioning equipment in aircraft; that is, to prevent intolerable fogging in the crew space or blinding condensation on windows, particularly during descent and landing.

In order that all of the structural features for attaining the objects of this invention may be readily understood, reference is herein made to the drawing wherein a perspective view of a preferred embodiment of the separator of this invention is shown.

In the moisture separator shown in the drawing, the gas, usually air, containing free moisture in drops of varying sizes enters the separator through inlet 1 of casing 2. The gas passes through turning vanes 3 where a spinning centrifugal motion is imparted to the gas. The gas continues in a circular helical path down through the open section 4 of the separator. A wick material 5 is located around the outer periphery of this passage and is held in place by outer casing 2 and a suitable wire mesh or screen 6.

The water particles or liquid particles entrained in the gas are thrown by centrifugal force to the outside of this moving gas stream. This causes the liquid particles to scrub the surface of the wick material 5, which because of its high affinity for liquids absorbs the liquid by capillary attraction. When the gas stream reaches the back 7 of the separator it must reverse its path as shown by the arrows 8 and travel forward again inside the rotating air stream to the entrance 9 of outlet pipe 10 of the separator.

The water that is absorbed by the scrubbing motion of the gas travels throughout the wick material because of the capillary attraction of the wick. The absorbed water tends to reach a state of equilibrium, that is, an equal amount of moisture is present in each portion of the wick, including that portion which forms the water outlet 11. The water outlet is formed by containing a portion of wick material 11, which is a continuation of the wick material 5, in a suitably shaped outlet casing 12. The wick material 11 may be retained in the outlet by a screen or open mesh 13 at the water outlet. Mesh 13 prevents the wick material from being pushed or blown out of outlet 12 because of any pressures however high existing inside the separator in passage 4, inlet 1, or outlet 10.

Even when the separator is discharging into the atmosphere, a positive pressure must exist in space 4 because of the pressure drop between this space and outlet 10. This pressure is sufficient to push the water out of wick material 11 and through the outlet 12 in a manner similar to pressure forcing water through a small opening or orifice. The water that is thus removed from the quantity of wick material 11 causes this portion of the wick material to contain less water than that of portion 5. Because wick material 11 contains less water, it is not saturated or in equilibrium with wick material 5. This causes additional water to travel from wick material 5 into material 11 thus insuring a continuous removal of the water.

The shape and length of the wick material 11 in outlet 12 is designed so that for whatever the pressure that exists in space 4 there is sufficient wick material 11 to prevent any passage of the air or gas through the water outlet, thus permitting only the moisture to travel to the outside of the separator. The wick material acts very much as a caulking material, and by itself is sufficient to plug opening 12 against the passage of any air or gas. However, the capillary attraction of the wick material permits liquids to pass through it as described above.

The separator herein described makes use of the capillary attraction of the wick material so that outlet 12 may be placed in any attitude, vertically or horizontally, to operate independently of gravity. The motive force for passage of the air or gas is the pressure drop between the inlet and outlet. This pressure drop together with any static pressure that may exist (as for instance, in a compressed air line) furnishes the motive force for pushing the water through the wick material and out of the unit. Thus the separator herein is capable of operating under conditions of zero gravity.

The advantages of the novel separator disclosed herein as compared to prior art separators are as follows:

(1) In the usual prior art separators, droplets or a quantity of liquid collect at the bottom of the casing and drain to the outlet; thus letting the rotary moving air stream pick up cerain amounts of the liquid after the particles have been separated. Using wick material, once the moisture comes into contact with the wick, it is immediately absorbed and is not present in free droplets in the casing.

(2) In separators heretofore used, it is necessary for the water to drain to the lowest point which presumably is an outlet shaped like outlet 12 where it could only be removed by a continuous bleeding of the air or gas together with the removed liquids. Thus, some of the air is lost. An alternative arrangement to prevent loss of this air would be to build a reservoir sufficiently large to replace outlet 12, which reservoir could be drained periodically of its water. The proposed separator provides for automatic continuous removal of the water without loss of the air.

(3) The proposed separator operates in any attitude and under conditions of zero gravity.

(4) By suitable design of the turning vanes 3 in the proposed separator, the pressure drop through the unit has proven to be much lower than comparable water separators.

(5) By actual test, it has been found that the proposed separator removes substantially all of the moisture in comparison with approximately 90% moisture separation in prior art separators.

It should be understood that the above described separator is merely illustrative of the application of the principles of this invention. Numerous other arrangements may be devised without departing from the scope of the invention.

What is claimed is:

1. A separator comprising a cylinder of wick material having open ends, a set of turning vanes leading into one end of said wick cylinder, a cylindrical casing enveloping said turning vanes and the wick cylinder and including a gas inlet pipe leading into said turning vanes and a gas outlet having a pipe projecting into said wick cylinder and axially aligned and spaced from said turning vanes, and a liquid outlet coupled to said casing and having wick material in physical contact with the wick material of said cylinder.

2. A separator comprising a cylinder of wick material having open ends, a set of turning vanes leading into one end of said wick cylinder, a casing enveloping said turning vanes and the wick cylinder and supporting the outer cylindrical wall of said wick cylinder by direct contact, and including a gas inlet leading into said turning vanes and a gas outlet having a pipe projecting into said wick cylinder and spaced from said turning vanes, and a liquid outlet coupled to said casing and including a mass of wick material in physical contact with said wick cylinder.

3. A separator comprising a cylinder of wick material having open ends, a set of turning vanes leading into one end of said wick cylinder and axially displaced therefrom, a casing enveloping said turning vanes and the wick cylinder and including a gas inlet leading into said turning vanes and a gas outlet axially aligned with said gas inlet and having a pipe projecting substantially into said wick cylinder and spaced from said turning vanes, and a liquid outlet coupled to said casing and having wick material in physical contact with the wick material of said cylinder.

4. A separator comprising a cylinder of wick material having open ends, a set of turning vanes leading into one end of said wick cylinder, a casing enveloping said turning vanes and the wick cylinder and including a gas inlet leading into said turning vanes and a gas outlet, including a pipe projecting into said wick cylinder and spaced from said turning vanes, and a liquid outlet coupled to said casing and having wick material in physical contact with the wick material of said cylinder.

5. A separator including a casing having a gas inlet and a gas outlet, a layer of wick material lining the wall of said casing, means disposed within said casing adjacent said inlet for directing inlet gases against the interior surface of said wick lining, means communicating with said outlet means and providing an outlet passageway adjacent the gas directing means, and a liquid outlet coupled to said casing and having wick material in physical contact with the wick material of said wick layer.

6. A separator including a casing having a gas inlet and a gas outlet, a layer of wick material lining the wall of said casing, means disposed within said casing adjacent said inlet for directing inlet gases against the interior surface of said wick lining, means communicating with said outlet means and providing an outlet passageway adjacent the gas directing means, and a liquid outlet formed within said casing wall and communicating with the wick material lining the wall of the casing, said layer of wick material completely covering said liquid outlet.

References Cited in the file of this patent

UNITED STATES PATENTS

| | | |
|---|---|---|
| 182,126 | Moon | Sept. 12, 1876 |
| 1,723,427 | Kamrath | Aug. 6, 1929 |
| 1,818,742 | Paradise | Aug. 11, 1931 |
| 1,985,338 | Caldwell | Dec. 25, 1934 |
| 2,001,309 | Kelly | May 14, 1935 |
| 2,775,873 | Jones | Jan. 1, 1957 |
| 2,823,760 | Andersen | Feb. 18, 1958 |